(12) United States Patent
Vargantwar (10) Patent No.: US 8,676,141 B1
(45) Date of Patent: Mar. 18, 2014

(54) POWER CONTROL BASED ON MOBILE RECEIVE DIVERSITY

(75) Inventor: Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 439 days.

(21) Appl. No.: 12/905,848

(22) Filed: Oct. 15, 2010

(51) Int. Cl.
*H04B 1/06* (2006.01)

(52) U.S. Cl.
USPC ............ 455/273; 455/67.11; 455/127.1; 455/134; 455/135; 455/226.2; 455/226.3; 455/277.1; 455/552.1; 375/150; 375/267; 375/345; 375/347; 370/332; 370/328; 370/343

(58) Field of Classification Search
USPC .......... 455/522, 67.11, 67.14, 273, 67.16, 69, 455/550.1, 552.1, 115.1–115.4, 132–139, 455/226.1–226.4, 277.1–277.2, 272, 275, 455/276.1, 127.1, 226.2, 226.3; 375/150, 375/267, 345, 347; 370/332, 328, 343
See application file for complete search history.

(56) References Cited

U.S. PATENT DOCUMENTS

| | | | | |
|---|---|---|---|---|
| 6,724,828 | B1* | 4/2004 | Dabak | 375/267 |
| 6,865,397 | B2* | 3/2005 | Park et al. | 455/522 |
| 7,363,016 | B2* | 4/2008 | Lee | 455/276.1 |
| 7,366,137 | B2* | 4/2008 | Abrishamkar et al. | 370/332 |
| 7,369,832 | B2* | 5/2008 | Cho | 455/276.1 |
| 7,433,384 | B2* | 10/2008 | Smee et al. | 375/142 |
| 7,532,664 | B2* | 5/2009 | Rimini et al. | 375/150 |
| 7,738,903 | B2* | 6/2010 | Chen et al. | 455/522 |
| 8,031,622 | B2* | 10/2011 | Padovani et al. | 370/252 |
| 8,059,770 | B2* | 11/2011 | Imagawa et al. | 375/347 |
| 2010/0103877 | A1* | 4/2010 | Wang et al. | 370/328 |
| 2011/0250928 | A1* | 10/2011 | Schlub et al. | 455/550.1 |
| 2012/0009968 | A1* | 1/2012 | Kludt et al. | 455/522 |

* cited by examiner

Primary Examiner — Junpeng Chen (57) ABSTRACT

A power control method in a mobile station having at least two antennas. The mobile station operates in a receive-diversity state in which the mobile station wirelessly receives communications with multiple antennas. The mobile station determines a relative gain of operating in the receive-diversity state versus operating in a non-receive-diversity state in which the mobile station wirelessly receives communications with one antenna rather than with multiple antennas. The mobile station uses the determined gain as a basis to set one or more power characteristic(s). The one or more power characteristic(s) may include (i) an initial power control setpoint for use by the mobile station to evaluate strength of received transmissions and (ii) an initial power level at which a remote entity transmits to the mobile station.

25 Claims, 7 Drawing Sheets

POWER CONTROL BASED ON MOBILE RECEIVE DIVERSITY

BACKGROUND

Many people use mobile stations, such as cell phones and personal digital assistants, to communicate with cellular wireless networks. These mobile stations and networks typically communicate with each other over a radio frequency (RF) air interface according to a wireless protocol. Mobile stations typically conduct wireless communications with one or more remote entities, such as base stations, base transceiver stations, base station controllers, radio network controllers, or access nodes. Each remote entity may be arranged to send communications to and receive communications from mobile stations over the RF air interface. Each remote entity may also provide the mobile station with access to other networks to which the remote entity is connected.

A particular instance of a mobile station communicating with a remote entity may be referred to as a session. In general, a mobile station that has a session with a remote entity can engage in wireless communication with any networks to which the remote entity provides access.

In order to initiate a session, the mobile station may request an air-interface connection from the remote entity, and the remote entity will responsively work to establish the air-interface connection with the mobile station. Once the session is established, the mobile station and the remote entity may exchange communications.

As the mobile station and the remote entity exchange communications, in some instances it may be the case that the remote entity is transmitting communications to be received by the mobile station. In this case, the remote entity may be referred to as a transmitting entity, while the mobile station may be referred to as a receiving entity. The communications may then be referred to as forward-link communications. Alternately, in some instances it may be the case that the mobile station is transmitting communications to be received by the remote entity. In this case, the mobile station may be referred to as the transmitting entity, while the remote entity may be referred to as the receiving entity. The communications may then be referred to as reverse-link communications. For both forward- and reverse-link communications, an amount of power used by a transmitting entity to transmit communications to a receiving entity may be referred to as a power level.

In general, the power level may take a range of values, though values at both ends of the range may have a mixed impact on the session. For example, a higher power level will generally improve the quality of a signal received by the receiving entity. However, the higher power level may also contribute to an increase in overall consumption of power by the transmitting entity, as well as interference with other communications being transmitted over the RF air interface. In contrast, a lower power level may avoid such unnecessary power consumption and interference, but may also result in an inferior signal quality, as compared with the higher power level.

Accordingly, it may be desirable during a session to identify an optimal power level. The optimal power level may, for example, be a power level at which acceptable signal quality may be maintained while minimizing power consumption, interference, and other negative effects of using a higher power level. In order to identify such an optimal power level, the transmitting entity and the receiving entity may engage in what is known as a power control process. A typical power control process works to identify optimal values for both (i) the power level at the transmitting entity and (ii) a setpoint used by the receiving entity to evaluate a determined strength of received communications.

During the session, the transmitting entity may transmit communications to the receiving entity at a given power level. As the receiving entity receives the communications, the receiving entity may periodically determine the strength of the received communications, such as by determining a signal-to-noise ratio (SNR) of the received communications. The receiving entity may then compare the determined strength with the setpoint. This comparison allows the receiving entity to assess the appropriateness of the power level. In particular, the receiving entity may determine whether the power level is too high or too low. Based on the comparison, the receiving entity may instruct the transmitting entity to either increase or decrease the power level in an effort to adjust the power level closer to the optimal power level.

As an example, the comparison may indicate that the received communications are rather weak, such that the receiving entity is not adequately receiving the communications. In this case, the receiving entity may determine that the power level is too low, and may instruct the transmitting entity to increase the power level. Generally, such an increase in the power level will result in an increase in quality for subsequently received communications. This increase in quality may help to ensure that an acceptable signal quality is maintained during the session.

As another example, the comparison may instead indicate that the received communications are unnecessarily strong, such that if the quality of the communications decreased, the receiving entity would still adequately receive the communications. In this case, the receiving entity may determine that the power level is too high, and may instruct the transmitting entity to decrease the power level. Generally, such a decrease in the power level will help to lessen any adverse effects on power consumption and interference resulting from the unnecessarily high power level.

Such increasing and decreasing of the power level may continue repeatedly during the session. With each repetition, the power level will be adjusted closer to the optimal power level.

Also during the session, as the receiving entity receives the communications, the receiving entity may periodically determine an error level of the received communications, such as by determining a frame error rate (FER) of the received communications. Based on the error level of the received communications, the receiving entity may either increase or decrease the setpoint.

As an example, the error level may indicate that the receiving entity is not adequately receiving the communications. In this case, the receiving entity may increase the setpoint. As the setpoint is used by the receiving entity to evaluate the determined strength of received communications, the increased setpoint may, in subsequent repetitions, trigger the receiving entity to instruct the transmitting entity to increase the power level. As discussed above, such an increase in the power level will generally result in an increase in quality for subsequently received communications. This increase in quality may help to ensure that an acceptable signal quality is maintained during the session.

As another example, the error level may instead indicate that the receiving entity is receiving unnecessarily high quality communications, such that if the quality of the communications decreased, the receiving entity would still adequately receive the communications. In this case, the receiving entity may decrease the setpoint. The decreased setpoint may, in subsequent repetitions, trigger the receiving entity to instruct the transmitting entity to decrease the power level. Generally, such a decrease in the power level will help to lessen any adverse effects on power consumption and interference resulting from the unnecessarily high power level.

Such increasing and decreasing of the setpoint may continue repeatedly during the session, triggering subsequent increasing or decreasing of the power level. With each repetition, the setpoint will be adjusted closer to the optimal setpoint, and the power level will be adjusted closer to the optimal power level.

As the transmitting entity transmits communications to be received by the receiving entity, the communications may follow multiple paths between the transmitting entity and the receiving entity. Some paths may be direct paths, meaning the communications follow a substantially straight line between the transmitting entity and the receiving entity. Other paths may be reflected paths, meaning the communications may be reflected off of obstructions one or more times before arriving at the receiving entity.

As a result of the reflections, the communications along the reflected paths may experience phase shifts, time delays, and other undesired alterations. At points in space between the transmitting entity and the receiving entity, the altered communications on the reflected paths and the communications on the direct path may destructively interfere with one another, resulting in what is known as multi-path fading. Multi-path fading may result in a degraded or even unusable reception of the communications at the receiving entity.

One option for combating multi-path fading is receive diversity. In receive diversity, the receiving entity uses two or more antennas to receive the communications transmitted by the transmitting entity. Each antenna may be distinguished from the other antenna(s) by one or more characteristics, such as its polarization, height, position, or radiation pattern (that is, the sensitivity of the antenna as a function of direction). As a result of these distinguishing characteristics, each of the two or more antennas may observe different degrees of multi-path fading. In some cases, one antenna may observe a much lower degree of multi-path fading than the other antennas, allowing the one antenna to receive the communications in a less degraded form.

As an example, the receiving entity may use two antennas. The antennas may have orthogonal polarizations, meaning the first antenna may be oriented in a first plane, while the second antenna may be oriented in a second plane orthogonal to the first plane. Typically, multi-path fading in the first plane will be independent of the multi-path fading in the orthogonal plane. Accordingly, as a result of the orthogonal polarization, the two antennas may observe different degrees of multi-path fading. In some cases, the second antenna may observe a much lower degree of multi-path fading than the first antenna, allowing the second antenna to receive the communications in a less degraded form.

Thus, through the use of two or more antennas, a receiving entity may receive two or more receptions of the same communications, one of which may be stronger than the other(s). In some cases, the receiving entity may simply select the strongest reception for processing. Such a technique may be referred to as selecting. In other cases, the receiving entity may combine the receptions at each of the antennas together for processing. This technique may be referred to as combining. In either case, receive diversity may improve the ability of the receiving entity to receive communications transmitted by the transmitting entity.

Overview

As noted above, a particular instance of a mobile station communicating with a remote entity may be referred to as a session. During the session, when the remote entity is transmitting communications to be received by the mobile station, the remote entity may serve as the transmitting entity, the mobile station may serve as the receiving entity, and the communications may be referred to as forward-link communications.

At the start of the session, the remote entity may use a predetermined power level to transmit communications to the mobile station. The power level used at the start of the session may be referred to as the initial power level. Similarly, at the start of the session, the mobile station may use a predetermined setpoint to evaluate a determined strength of the received communications. The setpoint used at the start of the session may be referred to as the initial power control setpoint. The initial power level and the initial power control setpoint may be used as starting values for a power control process.

As noted above, the power control process works to identify optimal values for both the power level at the remote entity, and the setpoint at the mobile station. In particular, as the power control process repeats, both the power level and the setpoint will be adjusted in an effort to approach the optimal values. Thus, to make the power control process more efficient (that is, to reach the optimal values in fewer repetitions), it is desirable to begin the process with values for the initial power level and the initial power control setpoint that are closer to their respective optimal values. To this end, in setting values for the initial power level and the initial power control setpoint, it may be desirable to take into account factors that may affect the power control process, and thus the optimal values.

As discussed above, receive diversity may improve the ability of the mobile station to receive communications transmitted by the remote entity. In particular, while the mobile station is operating in a receive-diversity state, the mobile station may receive stronger communications than while operating a non-receive-diversity state. Such an increase in the strength of received communications may have an impact on the power control process.

As an example, the stronger communications may cause the mobile station to determine that the power level is too high, such that the mobile station instructs the remote entity to decrease the power level. Similarly, the stronger communications may cause the mobile station to detect a lower error rate, such that the mobile station decreases the setpoint.

As receive diversity may thus affect the power control process, it may be desirable to take into account the use of receive diversity in setting values for the initial power level and the initial power control setpoint. In particular, it may be desirable to set the initial power level and the initial power control setpoint based on a predicted relative gain of the receiving entity operating in a receive-diversity state versus the receiving entity operating in a non-receive-diversity state.

Disclosed herein is thus a method and corresponding system for setting at least one power characteristic based on a predicted relative gain of the mobile station operating in a receive-diversity state versus operating in a non-receive diversity state.

According to an embodiment of the method, a mobile station operates in a receive-diversity state in which the mobile station wirelessly receives communications with multiple antennas. Additionally, the mobile station determines a relative gain of operating in the receive-diversity state versus operating in a non-receive-diversity state. Based on the determined gain, the mobile station may set one or more power characteristics, such as an initial power control setpoint for use by the mobile station to evaluate strength of received transmissions, and an initial power level at which a remote entity transmits to the mobile station.

According to another embodiment of the method, a mobile station operates in a non-receive-diversity state in which the mobile station wirelessly receives communications with a single antenna, and the mobile station operates in a receive-diversity state in which the mobile station wirelessly receives communications with multiple antennas. The mobile station compares the amplitude of the communications received in the non-receive-diversity state with the amplitude of the communications received in the receive-diversity state. From this comparison, the mobile station determines a relative gain of operating in the receive-diversity state versus operating in the non-receive diversity state. Based on the determined gain, the mobile station may set one or more power characteristics.

According to yet another embodiment of the method, a mobile station wirelessly receives communications using a first antenna, and the mobile station wirelessly receives communications using a second antenna. The mobile station compares the communications received using the first antenna with those received using the second antenna to determine a level of difference between the communications. Based on the determined level of difference, the mobile station determines a relative gain of receiving communications using both the first antenna and the second antenna as compared to receiving communications using only the first antenna or the second antenna. Based on the determined gain, the mobile station may set one or more power characteristics.

These as well as other aspects, advantages, and alternatives will become apparent to those of ordinary skill in the art by reading the following description, with reference where appropriate to the accompanying drawings. Further, it should be understood that the description provided by this document, including this overview section, is intended to explain the present method by way of example only and that numerous variations are possible.

DETAILED DESCRIPTION

1. Exemplary Architecture

Figure 1:
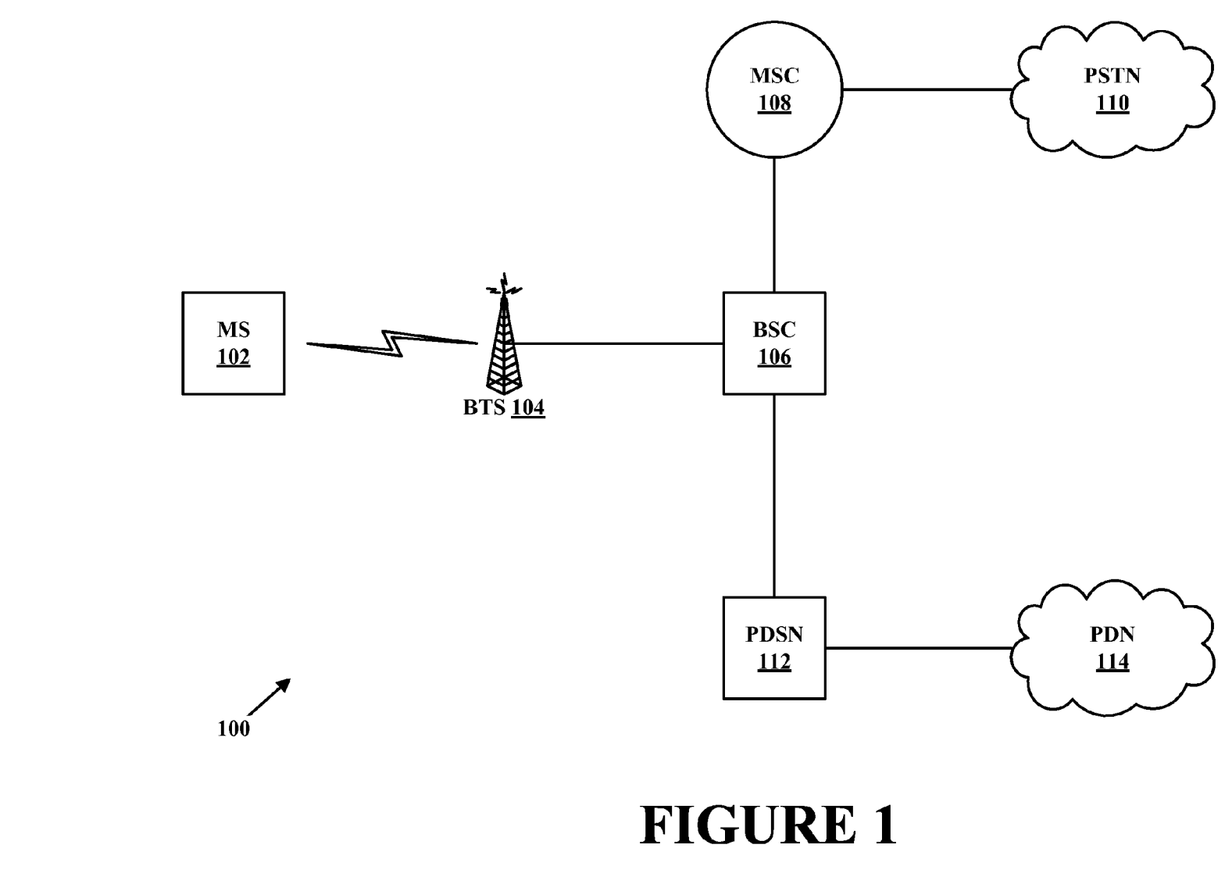
FIG. 1 is a simplified block diagram of a communication system in which an exemplary embodiment of the present method may be implemented.

FIG. 1 is a simplified block diagram of a communication system 100 in which an exemplary embodiment of the present method may be implemented. It should be understood, of course, that this and other arrangements and functions described herein are provided by way of example only and that numerous variations may be possible. For instance, elements can be added, omitted, combined, distributed, reordered, repositioned, or otherwise changed while remaining within the scope of the invention as defined by the claims. Further, it should be understood that various functions described herein can be carried out by hardware, firmware, and/or software (e.g., one or more processors programmed with machine language instructions to carry out the functions).

As shown in FIG. 1, communication system 100 includes a mobile station 102, a base transceiver station (BTS) 104, a base station controller (BSC) 106, a mobile switching center (MSC) 108, a public switched telephone network (PSTN) 110, a packet data serving node (PDSN) 112, and a packet-data network (PDN) 114. Further, additional entities could be present as well or instead. For example, there could be additional mobile stations in communication with BTS 104; furthermore, there could be additional entities in communication with PSTN 110 and/or PDN 114. Also, there could be one or more devices and/or networks making up at least part of one or more of the communication links. For example, there could be one or more routers, switches, or other devices or networks on the link between PDSN 112 and PDN 114.

Mobile station 102 may be or may include any mobile station arranged to carry out the mobile-station functions described herein. As such, mobile station 102 may include a user interface, a communication interface, a processor, and data storage comprising instructions executable by the processor for carrying out those mobile-station functions. Mobile station 102 is further described below in connection with FIGS. 2 and 3.

BTS 104 may be any network element arranged to carry out the BTS functions described herein. As such, BTS 104 may include a communication interface, a processor, and data storage comprising instructions executable by the processor to carry out those BTS functions. The communication interface may include one or more antennas, chipsets, and/or other components for providing one or more coverage areas such as cells and sectors, for communicating with mobile stations, such as mobile station 102, over an air interface. The communication interface may be arranged to communicate according to one or more protocols mentioned herein and/or any others now known or later developed. The communication interface may also include one or more wired and/or wireless interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least BTS 104, MSC 108, and PDSN 112. In general, BSC 106 functions to control one or more BTSs such as BTS 104, and to provide one or more BTSs such as BTS 104 with connections to devices such as MSC 108 and PDSN 112.

MSC 108 may include a communication interface, a processor, and data storage. The communication interface may include one or more wired and/or wireless interfaces for communicating with at least BSC 106 and PSTN 110. In general, MSC 108 functions as a switching element between PSTN 110 and one or more BSCs such as BSC 106, facilitating communication between mobile stations, such as mobile station 102, and PSTN 110, which may be the well-known public switched telephone network.

PDSN 112 may include a communication interface, a processor, and data storage. The communication interface may include one or more wired and/or wireless interfaces for communicating with at least BSC 106 and PDN 114. In general, PDSN 112 functions as a network access server between PDN 114 and BSCs such as BSC 106, facilitating packet-data communication between mobile stations, such as mobile station 102, and PDN 114.

PDN 114 may include one or more wide area networks, one or more local area networks, one or more public networks such as the Internet, one or more private networks, one or more wired networks, one or more wireless networks, and/or one or more networks of any other type. In one example, PDN 114 may include both the Internet and a private core packet-data network operated by a wireless carrier that operates BTS 104, BSC 106, etc. Devices in communication with PDN 114 may exchange data using a packet-switched protocol such as the Internet Protocol (IP), and may be identified by an address such as an IP address.

Figure 2:
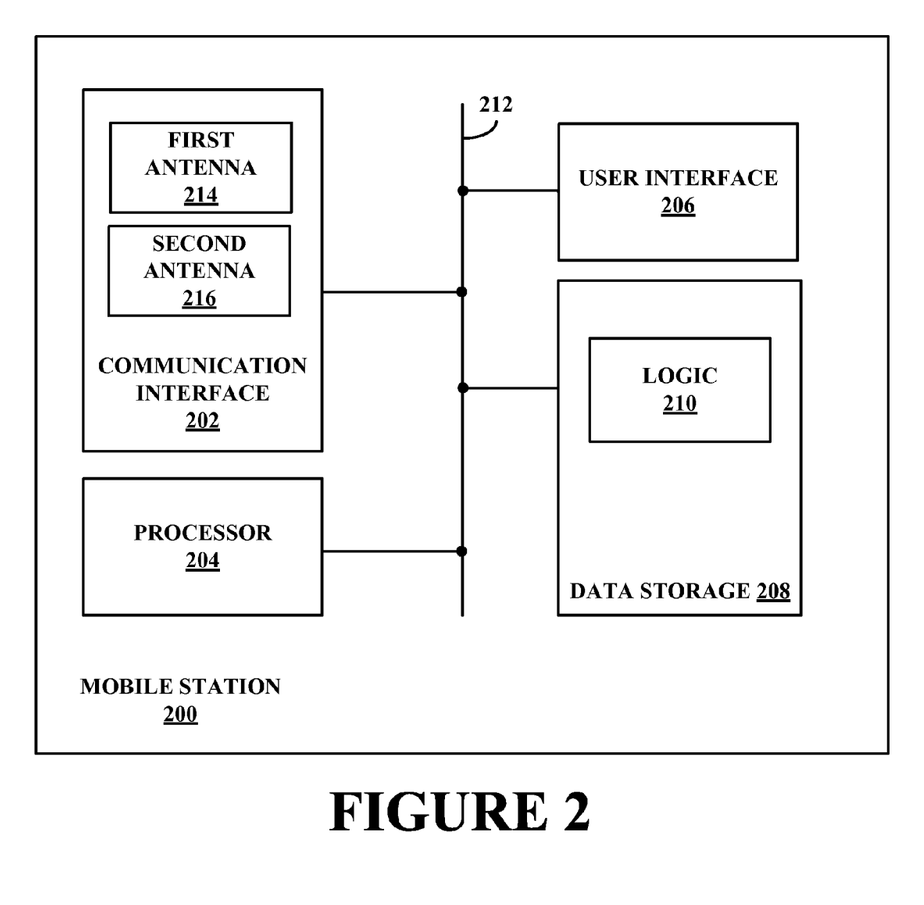
FIG. 2 is a simplified block diagram of a mobile station for use in the exemplary embodiment.

FIG. 2 is a simplified block diagram of a mobile station 200 for use in an exemplary embodiment of the present method. As shown, the mobile station 200 includes a communication interface 202, a processor 204, a user interface 206, and data storage 208 including logic 210. The elements of mobile station 200 are shown connected together by a system bus or other mechanism 212.

Communication interface 202 functions to facilitate air-interface communication with a remote entity, such as a BTS. Communication interface 202 is shown comprising a first antenna 214 and a second antenna 216. In some embodiments, communication interface 202 may comprise additional antennas. First and second antennas 214 and 216 allow the mobile station 200 to operate in either a non-receive-diversity state or in a receive diversity state.

In the non-receive-diversity state, the mobile station 200 may use either the first antenna 214 or the second antenna 216 for wirelessly communicating with a remote entity over an air interface. In the receive-diversity state, the mobile station 200 may use both of the first antenna 214 and the second antenna 216 for wirelessly communicating with the remote entity over the air interface. In the receive-diversity state, the mobile station 200 may also use additional antennas not shown. Operation in the receive-diversity state is further described below in connection with FIG. 3.

Communication interface 202 may additionally comprise a chipset for wirelessly communicating with the remote entity over the air interface. As an example, the chipset could be one that is suitable for CDMA communication. The chipset or communication interface 202 in general may also or instead be arranged to communicate according to one or more other types of wireless communication (e.g. protocols) mentioned herein and/or any others now known or later developed.

Processor 204 may comprise one or more general-purpose processors (such as INTEL processors or the like) and/or one or more special-purpose processors (such as digital-signal processors or application-specific integrated circuits). To the extent processor 204 includes more than one processor, such processors could work separately or in combination. Further, the processor 204 may be integrated in whole or in part with the with communication interface 202 and/or with other components.

User interface 206 may include one or more components for receiving input from a user of the mobile station, as well as one or more components for providing output to a user of the mobile station 200. The user interface 206 may include buttons, a touch screen, a microphone, and/or any other elements for receiving inputs, as well as a speaker, one or more displays, and/or any other elements for communicating outputs. Further, the user interface 206 may include analog/digital conversion circuitry to facilitate conversion between analog user input/output and digital signals on which the mobile station 200 can operate.

Data storage 208 may comprise one or more volatile and/or non-volatile storage components, such as optical, magnetic, and/or organic storage, and data storage 208 may be integrated in whole or in part with processor 204. Data storage 208 additionally includes logic 210.

Logic 210 is executable by the processor 204 to carry out the various mobile-station functions described herein. Logic 210 may be executable by the processor 204 to determine a relative gain of the mobile station 200 operating in the receive-diversity state versus operating in the non-receive-diversity state. Logic 210 may also be executable by the processor 204 to set at least one power characteristic based on the determined gain.

The mobile station 200 may additionally comprise elements instead of and/or in addition to those shown.

Figure 3:
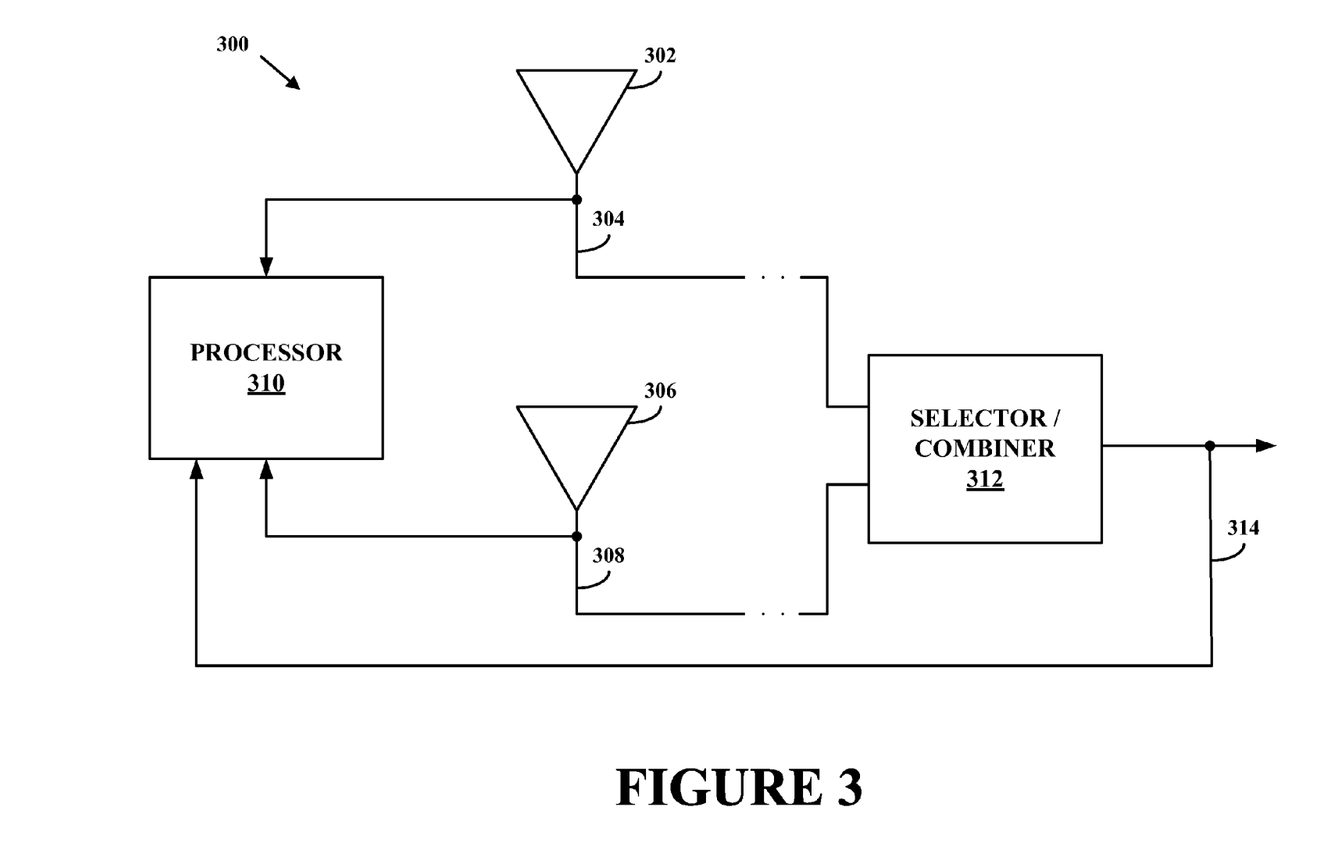
FIG. 3 is a simplified block diagram showing functional components of a mobile station arranged to implement the method.

FIG. 3 is a simplified block diagram showing functional components of a mobile station 300 arranged to implement the present method. As shown, mobile station 300 comprises a first antenna 302, a second antenna 306, a processor 310, and a selector/combiner 312 that produces an output signal 314.

When operating in a non-receive-diversity state, mobile station 300 may wirelessly receive communications with either the first antenna 302 or the second antenna 306. When operating in a receive-diversity state, mobile station 300 may wirelessly receive communications with both the first antenna 302 and the second antenna 306, and optionally other antennas not shown. In some embodiments, the first antenna 302 and the second antenna 306 may be orthogonally polarized. Alternately or additionally, the first antenna 302 and the second antenna 306 may be distinguished from one another in height, position, and/or radiation pattern, or in some other manner.

Communications received with the first antenna 302 may define a first input 304, and communications received with the second antenna 306 may define a second input 308. The first input 304 and the second input 308 may be different receptions of the same communications. In some cases, the first input 304 may be a stronger or less degraded reception of the communications than the second input 308, or vice versa. Both the first input 304 and the second input 308 may be provided to the selector/combiner 312. Selector/combiner 312 may function either as a selector or as a combiner.

When operating as a selector, the selector/combiner 312 may select from the first input 304 and the second input 308 the input that provides the stronger or less degraded reception of the communications. The selector/combiner may then output the selected input as the output signal 314.

When operating as a combiner, the selector/combiner 312 may combine the first input 304 and the second input 308 in an effort to construct a stronger reception of the communications. In some embodiments, the selector/combiner 312 may directly add the first input 304 and the second input 308 to produce the output signal 314. In other embodiments, the selector/combiner 312 may weight the stronger of the first input 304 and the second input 308 before coherently adding the inputs 304 and 308 to produce the output signal 314.

Each of the first input 304, the second input 308, and the output signal 314 may be provided to the processor 310. The processor 310 may use two or more of the first input 304, the second input 308, and the output signal 314 to determine a relative gain of the mobile station 200 operating in the receive-diversity state versus operating in the non-receive-diversity state.

In some embodiments, the processor 310 may compare one or more signal characteristic(s) of the first input 304 with the same signal characteristic(s) of the second input 308 in order to determine a level of difference between the communications respectively received at the first antenna 302 and the second antenna 306. Examples of signal characteristics include phase, time delay, polarization, amplitude, or other characteristics. Based on the determined level of difference, the processor 310 may determine the relative gain of the mobile station 200 operating in the receive-diversity state versus operating in the non-receive-diversity state.

In some embodiments, the processor 310 may compare an amplitude of the output signal 314 (representing communications received by the mobile station 200 while operating in the receive-diversity state) with an amplitude of communications received by the mobile station while operating in the non-receive-diversity state. The communications received while operating in the non-receive-diversity state may be received by either (but not both) of the first antenna 302 and the second antenna 306. Based on the comparison, the processor 310 may determine the relative gain of the mobile station 200 operating in the receive-diversity state versus operating in the non-receive-diversity state.

Figure 4:
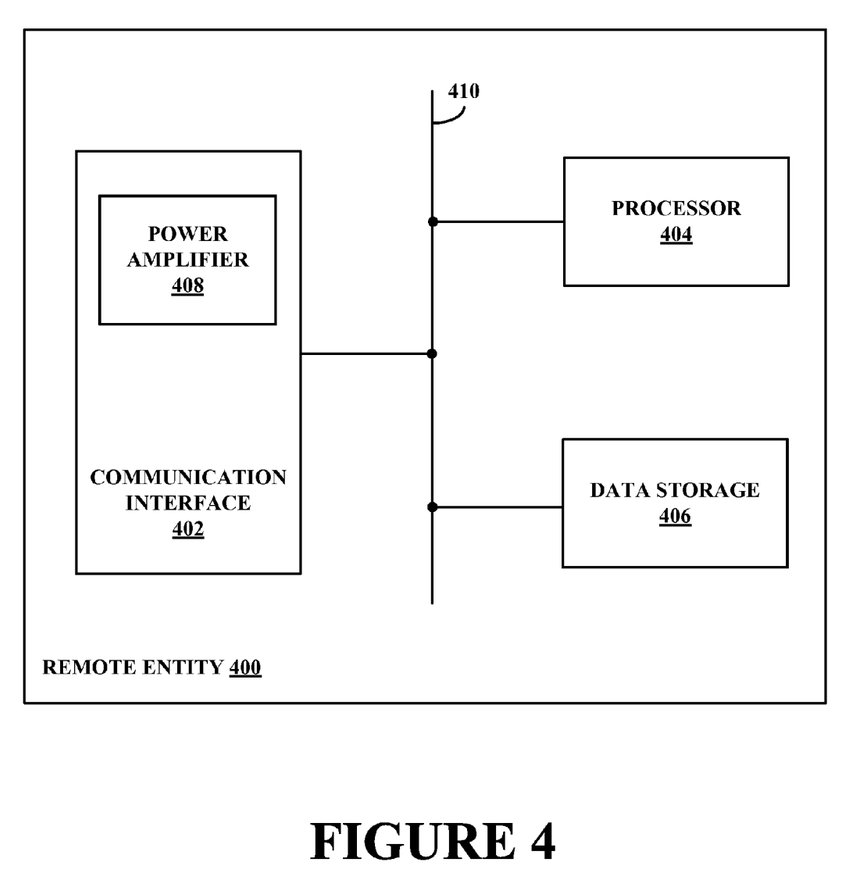
FIG. 4 is a simplified block diagram of a remote entity for use in an exemplary embodiment of the method.

FIG. 4 is a simplified block diagram of a remote entity 400 for use in an exemplary embodiment of the present method. Remote entity 400 may be one or more of a BTS, a BSC, a radio network controller (RNC), an access node, or other network device. Remote entity 400 is shown comprising a communication interface 402, a processor 404, and data storage 406. The elements of remote entity 400 are shown connected together by a system bus or other mechanism 408.

Communication interface 402 may include one or more antennas, one or more chipsets, a set of one or more channel elements, and/or one or more other components suitable for providing a wireless coverage area according to a wireless-communication protocol such as CDMA (and/or one or more other protocols). Communication interface 402 may additionally include a power amplifier 408. Power amplifier 408 may be a power amplifier with adjustable gain, and may be operable to control a power level at which the remote entity 400 transmits communications to a mobile station.

In some embodiments, communication interface 402 may be operable to receive from the mobile station a value that is usable by the remote entity 400 to set an initial power level at which the remote entity 400 transmits communications to the mobile station. Power amplifier 408 may be operable to set the initial power level based on the value received from the mobile.

Processor 404 may comprise one or more general purpose processors (e.g., INTEL microprocessors) and/or dedicated processors (e.g., digital signal processors). Data storage 406, in turn, may comprise one or more magnetic, optical, organic, or other storage components, whether volatile or non-volatile, and may be integrated in whole or in part with processor 404. In an embodiment of the method, data storage 406 may contain program logic executable by processor 404 to carry out various remote-entity functions described herein.

The remote entity 400 may additionally comprise elements instead of and/or other than those shown.

2. Exemplary Operation a. First Exemplary Method

Figure 5:
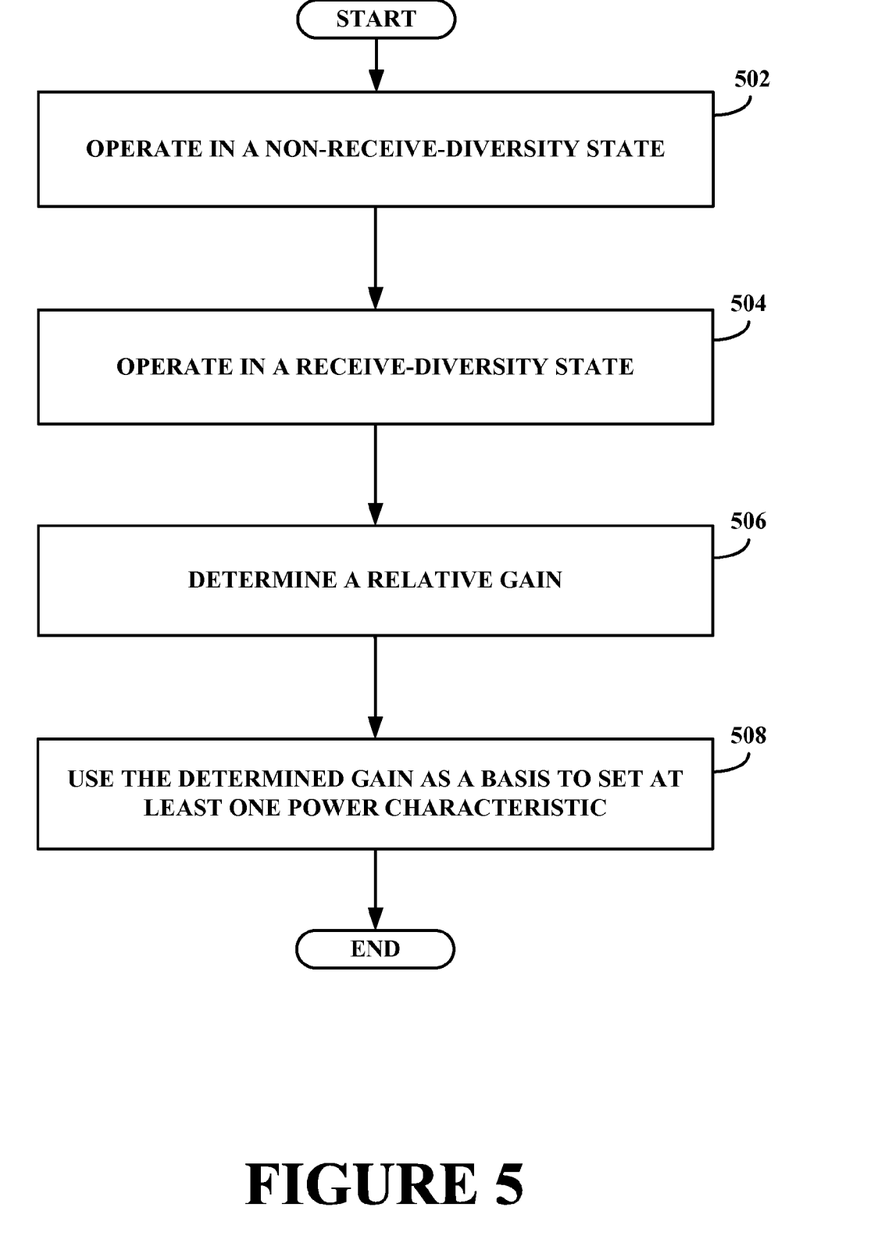
FIG. 5 is a flow chart depicting functions that can be carried out by an exemplary mobile station in accordance with the method.

FIG. 5 is a flow chart depicting functions that can be carried out by an exemplary mobile station in accordance with the present method. As shown, the method begins at step 502 where the mobile station operates in a non-receive-diversity state. As discussed above, when operating in the non-receive-diversity state, the mobile station uses one antenna and not multiple antennas to receive communications transmitted by the remote entity.

At step 504, the mobile station operates in a receive-diversity state. As discussed above, when operating in the receive-diversity state, the mobile station uses two or more antennas to receive communications transmitted by a remote entity. Step 504 may be performed either before or after step 502. That is, the order to steps 502 and 504 is not important.

At step 506, the mobile station determines a relative gain of operating in the receive-diversity state versus operating in the non-receive diversity state. This determination could be carried out in several ways.

For example, in the receive-diversity state, the mobile station may receive communications using a first antenna and a second antenna, such that the communications received using the first antenna may define a first input, and the communications received using the second antenna may define a second input. By comparing one or more characteristic(s) of the first input with the same one or more characteristic(s) of the second input, the mobile station may determine a level of difference between the first input and the second input. Based on the determined level of difference, the relative gain may be determined. This means of determining the relative gain will be further described below in connection with FIG. 6.

As another example, the mobile station may compare an amplitude of communications received in the non-receive-diversity state with an amplitude of communications received in the receive-diversity state. Based on the comparison, the relative gain may be determined. This means of determining the relative gain will be further described below in connection with FIG. 7.

The determined gain thus indicates any improved reception that may result from the mobile station operating in the receive-diversity state versus the mobile station operating in the non-receive-diversity state. As discussed above, such improved reception may have an impact on a power control process carried out between the mobile station and the remote entity.

Accordingly, at step 508, the mobile station uses the determined gain as a basis to set one or more power characteristic(s) involved in the power control process. The one or more power characteristic(s) may include, for example, an initial power control setpoint (used by the mobile station to evaluate the strength of received communications) and/or an initial power level at which the remote entity transmits to the mobile station. Three examples are described below.

As a first example, the mobile station using the determined gain as a basis to set the one or more power characteristic(s) may involve the mobile station looking up the determined gain in a table (or other set of correlation data) that correlates each value of determined gain with a corresponding value for use in setting the one or more power characteristic(s). By looking up a determined gain in the table, the mobile station may retrieve the value corresponding to the determined gain, and may use the corresponding value to set the one or more power characteristic(s).

In some embodiments, the corresponding value may be a value for the power characteristic itself. For example, if the one or more power characteristic(s) includes the initial power control setpoint, the corresponding value may be a value to use as the initial power control setpoint. In other embodiments, the corresponding value may be an adjustment value for use in adjusting a default value of a power characteristic. For example, if the one or more power characteristic(s) includes the initial power level, the corresponding value may be an adjustment value by which to adjust a default initial power level in order to establish the initial power level.

In this manner, the mobile station using the determined gain as a basis to set one or more power characteristic(s) may involve the mobile station looking up the determined gain in a table.

As a second example, instead of looking up the determined gain in the table, the mobile station may compare the determined gain to a pre-defined threshold. From the comparison, the mobile station may determine whether the determined gain exceeds the pre-defined threshold.

When the determined gain exceeds the pre-defined threshold, the mobile station may further determine an extent to which the determined gain exceeds the pre-defined threshold. The mobile station may then look up the determined extent in a table (or other set of correlation data) that correlates each value of determined extent with a corresponding value for use in setting the one or more power characteristic(s). As described above, the corresponding value may be a value for the power characteristic itself, or may be an adjustment value.

When the determined gain does not exceed the pre-defined threshold, the mobile station may, in some embodiments, not adjust the one or more power characteristic(s). By thus using the pre-defined threshold as a trigger to adjusting the one or more power characteristic(s), the mobile station may avoid unnecessarily adjusting the one or more power characteristic(s) in response to a determined gain that is less than the pre-defined threshold and is thus potentially insignificant.

In this manner, the mobile station using the determined gain as a basis to set one or more power characteristic(s) may involve the mobile station comparing the determined gain with a pre-defined threshold.

As a third example, in addition to or instead of looking up the determined gain in a table and/or comparing the determined gain with the pre-defined threshold as described above, the mobile station may transmit to the remote entity a value that the remote entity may use to set the initial power level. This value may be one or more of (i) the determined gain itself, (ii) a value to use for the initial power level, and/or (iii) an adjustment value by which to adjust the default initial power level in order to establish the initial power level. In the event the mobile station transmits to the remote entity the determined gain, the remote entity may look up the determined gain in a table or other set of correlation data and/or may compare the determined gain with a pre-defined threshold, as described above with respect to the mobile station.

At the conclusion of step 508, the method ends. The method may be carried out repeatedly on a periodic basis.

b. Second Exemplary Method

Figure 6:
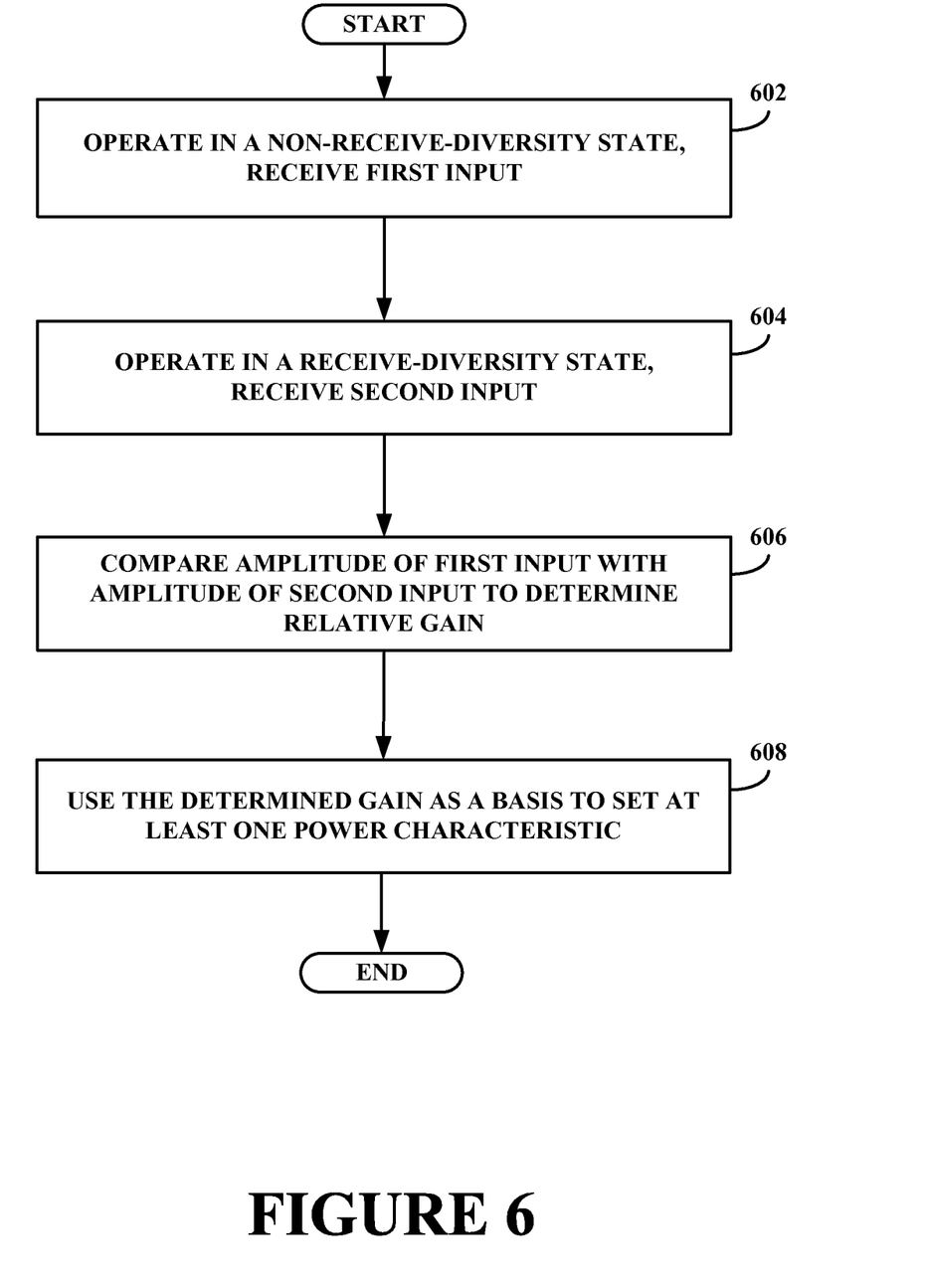
FIG. 6 is another flow chart depicting functions that can be carried out by an exemplary mobile station in accordance with the method.

FIG. 6 is another flow chart depicting functions that can be carried out by an exemplary mobile station in accordance with the method. As shown, the method begins at step 602 where the mobile station operates in a non-receive-diversity state and receives a first input. As noted above, when operating in the non-receive-diversity state, the mobile station receives communications from the remote entity using one antenna and not multiple antennas. The communications received while operating in the non-receive-diversity state define the first input.

At step 604, the mobile station operates in a receive-diversity state and receives a second input. As noted above, while operating in the receive-diversity state, the mobile station receives communications using two or more antennas. The communications received while operating in the receive-diversity state define the second input. Step 604 may be performed either before or after step 602. That is, the order to steps 602 and 604 is not important.

At step 606, the mobile station compares the amplitude of the first input with the amplitude of the second input in order to determine a relative gain of the mobile station operating in the receive-diversity state versus operating in a non-receive-diversity state. Typically, amplitude indicates the strength of a signal. Accordingly, by comparing the amplitudes of the first input and the second input, the mobile station may determine whether the communications received while operating in the receive-diversity state are stronger (have a larger amplitude) than those received while operating in the non-receive-diversity state. In particular, the mobile station may determine the relative gain of operating in the receive-diversity state versus operating in the non-receive diversity state.

If the second input has a significantly larger amplitude than the first input, it is likely the case that operating in a receive-diversity state is improving reception of the communications at the mobile station. Accordingly, the mobile station may determine that the relative gain is rather high. If, on the other hand, the second input has an amplitude that is smaller than or equal to the amplitude of the first signal, it is likely the case that operating in the receive-diversity state is not significantly improving reception of the communications at the mobile station. In this case, the mobile station may determine that the relative gain is rather low, or even non-existent.

Thus, the mobile station may use the comparison as a basis to determine the relative gain. The comparison of the amplitudes may include, for example, calculating a ratio of the amplitude of the second input to the amplitude of the first input. The comparison may additionally include looking up the calculated ratio in a table and/or comparing the calculated ratio to one or more pre-defined threshold(s). Other comparisons are possible as well.

Based on the comparison, the mobile station may determine a value or level for the relative gain. The relative gain may be, for example, a numeric value or range of values that may or may not correspond to actual measurements, or a qualitative level such as HIGH or LOW.

As a first example, once the mobile station calculates a ratio of the amplitude of the second input to the amplitude of the first input, the mobile station may look up the ratio in a table and retrieve from the table a numeric value for the determined gain. For instance, the table may indicate that the determined gain takes a numeric value. This numeric value may correspond to an actual measurement of some kind, or may simply be an indication of the relative strength of the first input and the second input. Alternatively, the mobile station may retrieve a qualitative level from the table, such as LOW. This value may indicate that the ratio is associated with a low level of gain.

As a second example, once the mobile station calculates a ratio of the amplitude of the second input to the amplitude of the first input, the mobile station may compare the calculated ratio to one or more pre-defined threshold(s). For instance, if the ratio exceeds the one or more pre-defined threshold(s), the determined gain may take the level HIGH. If, on the other hand, the ratio does not exceed the one or more pre-defined threshold(s), the determined gain may take the level LOW. Alternately, the determined gain may take a numeric value, as described above. Other examples are possible as well.

In this manner, the mobile station may compare the amplitude of the first input with the amplitude of the second input in order to determine a relative gain of the mobile station operating in the receive-diversity state versus operating in a non-receive-diversity state.

At step 608, the mobile station uses the determined gain as a basis to set one or more power characteristic(s). As described above (in step 506), this may involve one or more of looking up the determined gain in a table, comparing the determined gain with the pre-defined threshold, and/or transmitting to the remote entity one or more value(s) that the remote entity may use to set the one or more power characteristic(s).

At the conclusion of step 608, the method ends. The method may be carried out repeatedly on a periodic basis.

c. Third Exemplary Method

Figure 7:
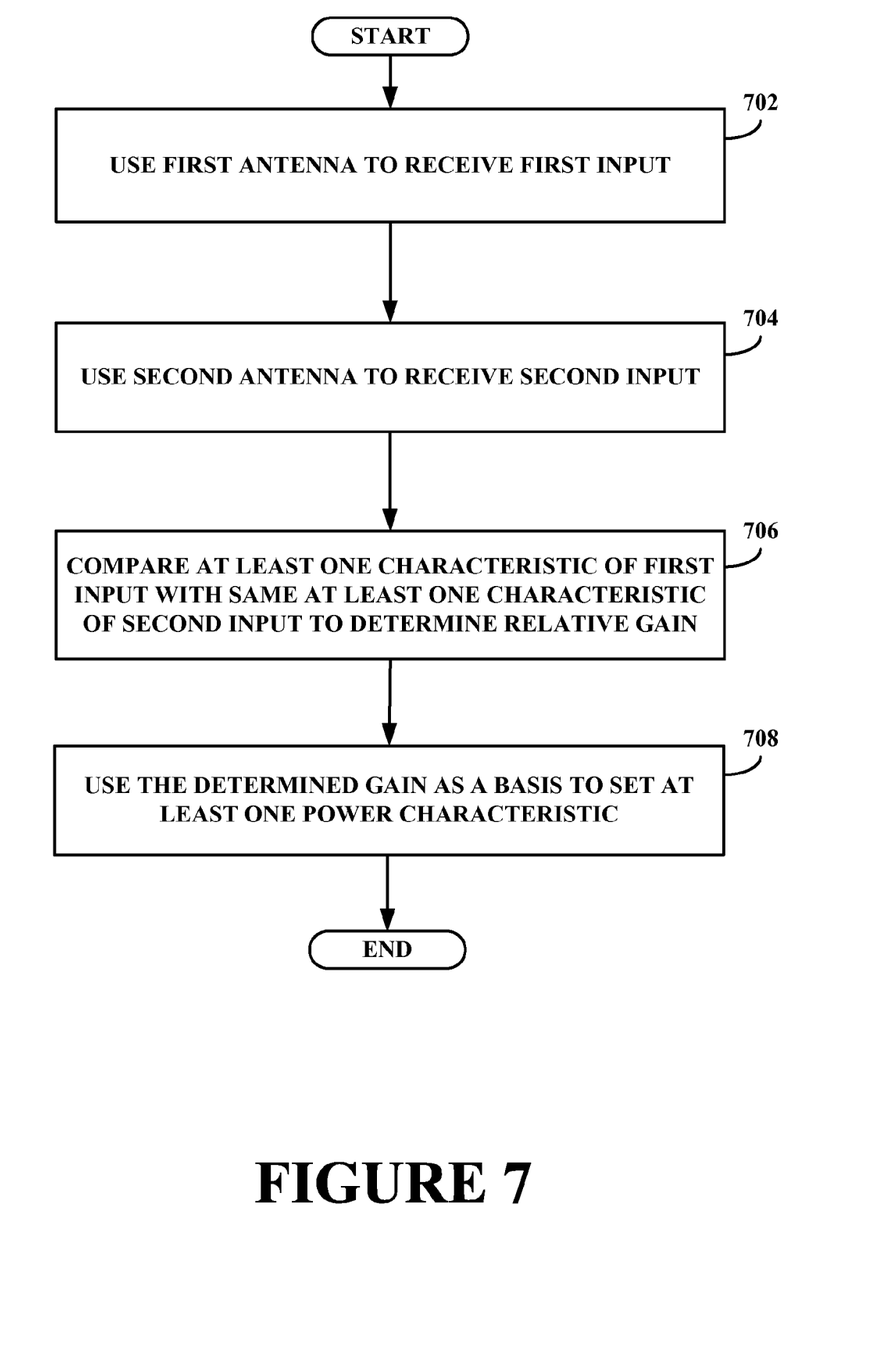
FIG. 7 is another flow chart depicting functions that can be carried out by an exemplary mobile station in accordance with the method.

FIG. 7 is another flow chart depicting functions that can be carried out by an exemplary mobile station in accordance with the method. As shown, the method begins at step 702 where the mobile station uses a first antenna to receive a first input. In particular, the mobile station may use the first antenna to receive communications transmitted by a remote entity, and the communications received using the first antenna may define the first input.

At step 704, the mobile station uses a second antenna to receive a second input. That is, the mobile station may use the second antenna to receive communications transmitted by the remote entity, and the communications received using the second antenna may define the second input. Steps 702 and 704 may be performed substantially simultaneously, such that the mobile station is using both the first antenna and the second antenna to receive communications. In this case, the mobile station may be said to be operating in a receive-diversity state during each of steps 702 and 704.

At step 706, the mobile station compares one or more characteristic(s) of the first input with the same one or more characteristic(s) of the second input in order to determine a relative gain of receiving communications using both the first antenna and the second antenna as compared to receiving communications using only one of the first antenna or the second antenna. The one or more characteristic(s) may include, for example, the phase, signal strength, and/or amplitude of the communications.

As noted above, reflections along paths between the remote entity and the mobile station may result in phase shifts, time delays, and other undesired alterations in each of the received communications. In general, in an environment that does not involve many obstructions, meaning the communications likely have not been reflected, the communications received at the first antenna will be similar to those received at the second antenna, resulting in a low level of difference. In this sort of environment, receive diversity may not have a large impact on reception, as described above. In contrast, in an environment that involves many obstructions, meaning the communications likely have been reflected several times, the communications received at the first antenna will be substantially different from those received at the second antenna, resulting in a high level of difference. In this sort of environment, receive diversity may have a large impact on reception, as described above.

In this manner, the level of difference between the communications received at the first antenna and those received at the second antenna may indicate whether or not receive diversity is having a large impact on reception.

Accordingly, when the mobile station determines a higher level of difference between the one or more characteristic(s) of the first input and the second input, the mobile station may determine a high relative gain of receiving the communications using both the first antenna and the second antenna as compared to receiving communications using only one of the first antenna or the second antenna. On the other hand, when the mobile station determines a lower level of difference between the one or more characteristic(s) of the first input and the second input, the mobile station may determine a low relative gain. As described above, the relative gain may be a numeric value, range of values, or a qualitative level. Similarly, the level of difference may also be a numeric value, range of values, or a qualitative level.

As an example, at step 706 the mobile station may compare the phase of the first input with the phase of the second input. The mobile station may additionally compare one or more other characteristics. The mobile station may determine that the phase of the first input is very different than the phase of the second input. That is, the mobile station may determine a high level of difference. As the determined level of difference is high, the mobile station may determine a high relative gain of receiving the communications using both the first antenna and the second antenna as compared to receiving communications using only one of the first antenna or the second antenna. Other examples are possible as well.

At step 708, once the mobile station has determined a relative gain, the mobile station uses the determined relative gain as a basis to set one or more power characteristic(s). As described above, this may involve one or more of looking up the determined gain in a table, comparing the determined gain with the pre-defined threshold, and/or transmitting to the remote entity one or more value(s) that the remote entity may use to set the one or more power characteristic(s).

At the conclusion of step 708, the method ends. The method may be carried out repeatedly on a periodic basis.

3. Conclusion

An exemplary embodiment has been described above. It should be understood, however, that variations from the embodiment discussed are possible, while remaining within the true spirit and scope of the invention as claimed.

The invention claimed is:

1. In a mobile station having at least two antennas, a power control method comprising:
the mobile station operating in a receive-diversity state in which the mobile station wirelessly receives communications with multiple antennas;
the mobile station determining a relative gain of operating in the receive-diversity state versus operating in a non-receive-diversity state;
the mobile station using the determined relative gain as a basis to set at least one power characteristic, wherein the at least one power characteristic is selected from the group consisting of (i) an initial power control setpoint for use by the mobile station to evaluate strength of received transmissions, and (ii) an initial power level at which a remote entity transmits to the mobile station.

2. The power control method of claim 1, wherein determining the relative gain comprises:
receiving communications using a first antenna of the multiple antennas, wherein the communications received by the first antenna define a first input;
receiving communications using a second antenna of the multiple antennas, wherein the communications received by the second antenna define a second input;
comparing at least one signal characteristic of the first input with the same at least one signal characteristic of the second input to determine a level of difference between the respectively received communications; and based on the determined level of difference, determining the relative gain.

3. The power control method of claim 1, wherein determining the relative gain comprises:
comparing an amplitude of communications received in the receive-diversity state with an amplitude of communications received in the non-receive diversity state; and
based on the comparison, determining the relative gain.

4. The power control method of claim 1, wherein the at least one power characteristic comprises the initial power control setpoint, and wherein using the determined relative gain as a basis to set the at least one power characteristic comprises the mobile station looking up the determined relative gain in a table and retrieving one or both of (a) a value to use for the initial power control setpoint, and (b) an adjustment value by which to adjust a default initial power control setpoint to establish the initial power control setpoint.

5. The power control method of claim 1, wherein the at least one power characteristic comprises the initial power control setpoint, and wherein using the determined relative gain as a basis to set the at least one power characteristic comprises:
comparing the determined relative gain with a pre-defined threshold; and
if the determined relative gain exceeds the pre-defined threshold, selecting an adjustment value by which to adjust a default initial power control setpoint to establish the initial power control setpoint, wherein the adjustment value is selected based on an extent to which the determined relative gain exceeds the pre-defined threshold.

6. The power control method of claim 1, wherein the at least one power characteristic comprises the initial power level, and wherein using the determined relative gain as a basis to set the at least one power characteristic comprises the mobile station looking up the determined relative gain in a table and retrieving one or both of (a) a value to use for the initial power level, and (b) an adjustment value by which to adjust a default initial power level to establish the initial power level.

7. The power control method of claim 1, wherein the at least one power characteristic comprises the initial power level, and wherein using the determined relative gain as a basis to set the at least one power characteristic comprises:
comparing the determined relative gain with a pre-defined threshold; and
if the determined relative gain exceeds the pre-defined threshold, selecting an adjustment value by which to adjust a default initial power level to establish the initial power level, wherein the adjustment value is selected based on an extent to which the determined relative gain exceeds the pre-defined threshold.

8. The power control method of claim 1, wherein the at least one power characteristic comprises the initial power level, and wherein using the determined relative gain as a basis to set the at least one power characteristic comprises the mobile station transmitting to the remote entity a value that is usable by the remote entity to set the initial power level.

9. The power control method of claim 8, wherein the value that is usable by the remote entity to set the initial power level is selected from the group consisting of (a) the determined relative gain, (b) a value to use for the initial power level, and (c) an adjustment value by which to adjust a default initial power level to establish the initial power level.

10. The power control method of claim 1, wherein the remote entity is one of a base station, a base transceiver station, a base station controller, a radio network controller, and an access node.

11. The power control method of claim 1, wherein operating in the non-receive-diversity state comprises the mobile station wirelessly receiving communications with just a single antenna rather than multiple antennas.

12. The power control method of claim 1, carried out on a periodic basis.

13. In a mobile station having at least two antennas, a power control method comprising:
the mobile station operating in a non-receive-diversity state in which the mobile station wirelessly receives communications using a single antenna, wherein the communications received in the non-receive-diversity state define a first input;
the mobile station operating in a receive-diversity state in which the mobile station wirelessly receives communications with multiple antennas and combines the communications received with the multiple antennas together to establish a second input;
the mobile station comparing an amplitude of the first input with an amplitude of the second input to determine a relative gain of operating in the receive-diversity state versus operating in the non-receive-diversity state; and
the mobile station using the determined relative gain as a basis to set at least one power characteristic, wherein the at least one power characteristic is selected from the group consisting of (i) an initial power control setpoint for use by the mobile station to evaluate strength of received transmissions, and (ii) an initial power level at which a remote entity transmits to the mobile station.

14. The power control method of claim 13, wherein the at least one power characteristic comprises the initial power control setpoint, and wherein using the determined relative gain as a basis to set the at least one power characteristic comprises the mobile station looking up the determined relative gain in a table and retrieving one or both of (a) a value to use for the initial power control setpoint, and (b) an adjustment value by which to adjust a default initial power control setpoint to establish the initial power control setpoint.

15. The power control method of claim 13, wherein the at least one power characteristic comprises the initial power control setpoint, and wherein using the determined relative gain as a basis to set the at least one power characteristic comprises:
comparing the determined relative gain with a pre-defined threshold; and
if the determined relative gain exceeds the pre-defined threshold, selecting an adjustment value by which to adjust a default initial power control setpoint to establish the initial power control setpoint, wherein the adjustment value is selected based on an extent to which the determined relative gain exceeds the pre-defined threshold.

16. The power control method of claim 13, wherein the at least one power characteristic comprises the initial power level, and wherein using the determined relative gain as a basis to set the at least one power characteristic comprises the mobile station looking up the determined relative gain in a table and retrieving one or both of (a) a value to use for the initial power level, and (b) an adjustment value by which to adjust a default initial power level to establish the initial power level.

17. The power control method of claim 13, wherein the at least one power characteristic comprises the initial power level, and wherein using the determined relative gain as a basis to set the at least one power characteristic comprises:
    comparing the determined relative gain with a pre-defined threshold; and
    if the determined relative gain exceeds the pre-defined threshold, selecting an adjustment value by which to adjust a default initial power level to establish the initial power level, wherein the adjustment value is selected based on an extent to which the determined relative gain exceeds the pre-defined threshold.

18. The power control method of claim 13, wherein the at least one power characteristic comprises the initial power level, and wherein using the determined relative gain as a basis to set the at least one power characteristic comprises the mobile station transmitting to the remote entity a value that is usable by the remote entity to set the initial power level.

19. In a mobile station having at least two antennas, a power control method comprising:
    the mobile station wirelessly receiving communications using a first antenna, wherein the communications received using the first antenna define a first input;
    the mobile station wirelessly receiving communications using a second antenna, wherein the communications received using the second antenna define a second input;
    the mobile station comparing at least one signal characteristic of the first input with the same at least one signal characteristic of the second input to determine a level of difference between the first input and the second input;
    the mobile station using the determined level of difference as a basis to determine a relative gain of receiving communications using both the first antenna and the second antenna as compared to receiving communications using only one of the first antenna or the second antenna;
    the mobile station using the determined relative gain as a basis to set at least one power characteristic, wherein the power characteristic is selected from the group consisting of (i) an initial power control setpoint for use by the mobile station to evaluate strength of received transmissions, and (ii) an initial power level at which a remote entity transmits to the mobile station.

20. The power control method of claim 19, wherein the at least one power characteristic comprises the initial power control setpoint, and wherein using the determined relative gain as a basis to set the at least one power characteristic comprises the mobile station looking up the determined relative gain in a table and retrieving one or both of (a) a value to use for the initial power control setpoint, and (b) an adjustment value by which to adjust a default initial power control setpoint to establish the initial power control setpoint.

21. The power control method of claim 19, wherein the at least one power characteristic comprises the initial power control setpoint, and wherein using the determined relative gain as a basis to set the at least one power characteristic comprises:
    comparing the determined relative gain with a pre-defined threshold; and
    if the determined level of difference exceeds the pre-defined threshold, selecting an adjustment value by which to adjust a default initial power control setpoint to establish the initial power control setpoint, wherein the adjustment value is selected based on an extent to which the determined relative gain exceeds the pre-defined threshold.

22. The power control method of claim 19, wherein the at least one power characteristic comprises the initial power level, and wherein using the determined relative gain as a basis to set the at least one power characteristic comprises the mobile station looking up the determined relative gain in a table and retrieving one or both of (a) a value to use for the initial power level, and (b) an adjustment value by which to adjust a default initial power level to establish the initial power level.

23. The power control method of claim 19, wherein the at least one power characteristic comprises the initial power level, and wherein using the determined relative gain as a basis to set the at least one power characteristic comprises:
    comparing the determined relative gain with a pre-defined threshold; and
    if the determined relative gain exceeds the pre-defined threshold, selecting an adjustment value by which to adjust a default initial power level to establish the initial power level, wherein the adjustment value is selected based on an extent to which the determined relative gain exceeds the pre-defined threshold.

24. The power control method of claim 19, wherein the at least one power characteristic comprises the initial power level, and wherein using the determined relative gain as a basis to set the at least one power characteristic comprises the mobile station transmitting to the remote entity a value that is usable by the remote entity to set the initial power level.

25. The power control method of claim 19, wherein the at least one signal characteristic is selected from the group consisting of phase, signal strength, and amplitude.

* * * * *